United States Patent
Coleman et al.

[11] Patent Number: 5,874,119
[45] Date of Patent: Feb. 23, 1999

[54] NOVELTY CANDY HOLDER AND DISPENSER

[76] Inventors: Thomas J. Coleman, 19170 Paddock Pl., Abingdon, Va. 24211; William K. Schlotter, IV, 117 Wateredge La., Fredericksburg, Va. 22406; Primcess Ann Coleman, 19170 Paddock Pl., Abingdon, Va. 24211; Ann M. Schlotter, 117 Wateredge La., Fredericksburg, Va. 22406

[21] Appl. No.: 722,620

[22] Filed: Sep. 27, 1996

Related U.S. Application Data

[63] Continuation-in-part of Ser. No. 386,467, Feb. 10, 1995, abandoned.

[51] Int. Cl.$^6$ ..................................................... A63H 3/00
[52] U.S. Cl. ........................... 426/104; 426/134; 446/73; 446/489
[58] Field of Search .............................. 426/91, 104, 110, 426/115, 134, 421; D1/102, 103, 105, 109, 127; 206/385; 401/95, 1.5, 45.15, 45.14; 446/73, 359, 366, 391, 489, 320

[56] References Cited

U.S. PATENT DOCUMENTS

| | | | |
|---|---|---|---|
| 1,164,909 | 12/1915 | Auberlin | 40/607 |
| 1,652,789 | 12/1927 | Moore | 426/139 |
| 1,835,719 | 12/1931 | Darr | 426/134 |
| 1,933,596 | 11/1933 | MacLean | 426/115 |
| 2,929,721 | 3/1960 | Mitzenmacher | 426/134 |
| 3,481,458 | 12/1969 | Mayeaux | 206/527 |
| 3,663,717 | 5/1972 | Coster | 426/104 |
| 3,920,156 | 11/1975 | Hicks | 222/80 |
| 4,350,712 | 9/1982 | Kocharian et al. | 426/134 |
| 5,111,973 | 5/1992 | Muller | 222/386 |
| 5,324,527 | 6/1994 | Coleman | 426/134 |

*Primary Examiner*—Curtis E. Sherrer
*Attorney, Agent, or Firm*—Melvin L. Crane

[57] ABSTRACT

A novelty candy holder and dispenser which comprises a main housing with a conical insert. A handle extends downwardly from the main body and is provided with lock pins. The handle can be pushed upwardly to force the candy upwardly from the housing and be rotating the handle look pins on the handle fit into slots to lock the candy sucker in place.

8 Claims, 2 Drawing Sheets

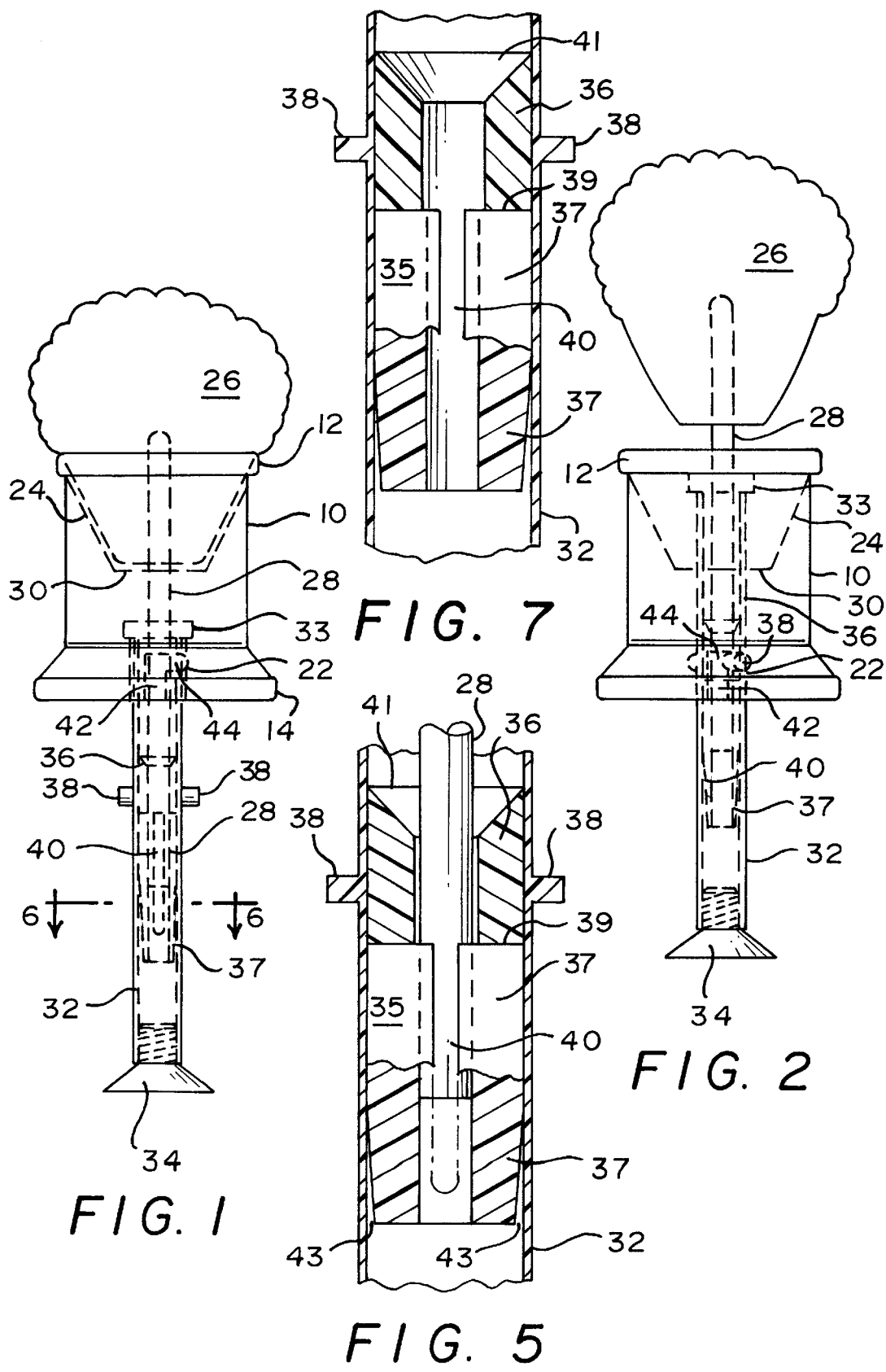

NOVELTY CANDY HOLDER AND DISPENSER

CROSS REFERENCE TO A RELATED APPLICATION

This application is a continuation-in-part of application Ser. No. 08/386467, filed Feb. 10, 1995 which is now abandoned.

BACKGROUND OF THE INVENTION

This invention relates to a candy holding and dispensing device and more particularly to a candy sucker holder. The candy sucker has an appearance of a brain when ready for use.

Heretofore different types of dispensers have been provided for dispensing small pieces of candy, pill, etc. The following U.S. patents have been issued dealing with dispenser type devices.

U.S. Pat. Nos. 1,164,909; 2,973,882; 4,311,251; 4,350,712; and 5,277,645.

BRIEF DESCRIPTION OF THE DRAWINGS

FIG. 1 illustrates a side view of the device with a portion of a sucker positioned within a housing portion;

FIG. 2 illustrates a side view of a sucker in a position for consumption;

FIG. 5 illustrates a partial cross-sectional view illustrating more particularly the sucker stick holder with the sucker stick in place;

FIG. 7 is a partial cross-sectional view of the sucker stick holder without the sucker stick held by the sucker stick holder.

DETAILED DESCRIPTION OF THE DRAWINGS

Figure 3:
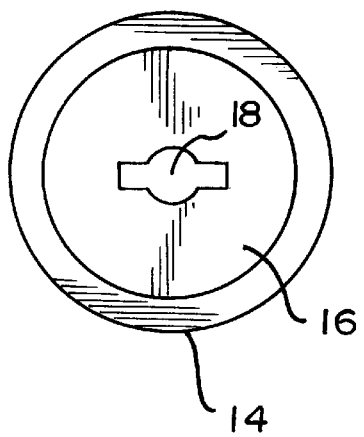
FIG. 3 illustrates a bottom ring enclosure as seen from below.

Now referring to the drawing there is shown a side view of the candy holding and dispensing device. The device includes a cylindrical housing 10 having an upper ring 12 and a lower ring 14. The bottom of the housing includes a solid end enclosure 16 having a central lock sleeve opening 18 through which lock pins 38 on a hand held cylindrical control stick 32 extend and which locks the sucker in an upward position in a lock sleeve 22. The upper end of the housing has a conical shaped enclosure 24 which extends downwardly into the housing 10 from the upper ring 12. A sucker 26 on the upper end of a sucker stick 28 extends into the conical shaped enclosure when the sucker is stored in a non-use position. The bottom of the cone has an aperture 30 through which a stop ring 33 on an end of the hand held control stick 32 passes when the sucker is pushed upwardly for consumption, The hand held cylindrical control stick 32 extends. downwardly from the housing and is provided with a suction cup 34 on its lower end by which the sucker device can be secured onto a surface (not shown) in an upright position. The hand held control stick extends downwardly from the control stick ring 32 passes through the lock sleeve 22 and the end enclosure to extend below the housing. The control stick is provided with oppositely disposed radially extending pins 38 which will be explained in more detail later. The control stick 32 is cylindrical and includes therein, in an area of the pins 38, a cylindrical sucker stick holder 35 which includes an upper cylindrical end 36 by which the sucker stick holder is secured in the control stick and which has an axial funnel shape 41 which guides the lower end of the sucker stick into a sucker stick gripper 37 which includes an axial passage for holding the candy stick. The candy stick holder has a semi-circular cut 39 at the juncture of the sucker stick gripper with the funnel-shaped guide. The candy stick gripper has a smaller outer diameter than that of the upper cylindrical end 36 and is provided with a linear expansion slot 40 which permits the inner diameter of the candy stick gripper to expand upon receiving the lower end of the sucker stick. The smaller outer diameter of the candy stick gripper forms a spacing 43 between the outer diameter of the candy stick gripper and the inner surface of the control stick.

The lock sleeve has oppositely disposed slots 42 through which the lock pins extend as the control stick is moved upward to force the sucker from the conical shaped upper end. The lock sleeve is also provided with horizontal slots 44 that meet with the vertical slots in which the pins 38 are rotated in order to secure the control stick in an upward position as shown in FIG. 2. When the lock pins 38 are rotated with the horizontal slots the sucker is positioned above the housing with a portion of the control stick extending below the housing which can be held by the user.

Figure 4:
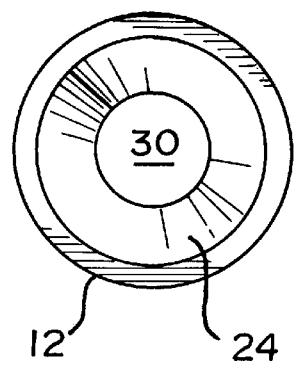
FIG. 4 illustrates the top ring looking as seen from above.

FIGS. 1 and 2 are side views of the candy holding device. FIG. 1 illustrates the candy sucker in a stored position in the housing and FIG. 2 illustrates the control stick locked in the lock sleeve with the candy pushed above the housing. FIG. 3 illustrates the bottom enclosure illustrating the central aperture 18 through which the pins 38 pass when the control stick is pushed upwardly and locked in place in the horizontal slots 44. FIG. 4 illustrates the upper end of the housing which is conical in shape in order to receive a portion of the candy sucker when in the stored position.

Figure 6:
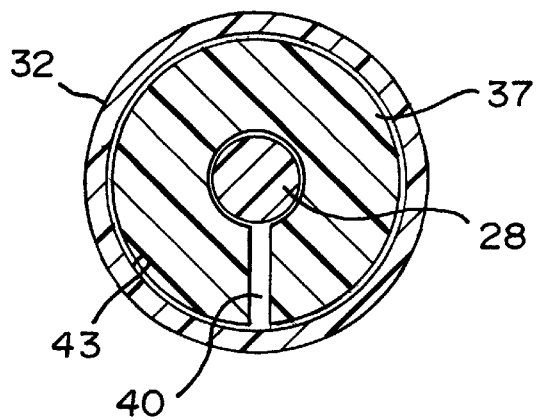
FIG. 6 is a cross-sectional view taken along lines 6—6 below the end of the sucker stick to show a spacing between the sucker stick holder and the hand held control stick.

FIG. 5 is a partial cross-sectional view illustrating the candy stick holder including the funnel shaped end shown in cross section, the slot 40 in the candy stick gripper and a portion of the candy stick gripper in cross section. It is to be noted that the funnel shaped end is secured against the inner diameter of the control stick and the portion of the candy stick gripper that has the end of the sucker stick held therein is also against the inner surface of the control stick. This is because the candy stick has caused the candy stick gripper to expand outwardly because of the slot 40 and that the candy stick is larger than the control passage of the candy stick gripper. A spacing is shown along the portion of the candy stick gripper which does not include the end of the candy stick. In order to more clearly show the spacing between the inner surface of the control stick and the candy stick gripper FIG. 7 has been added. FIG. 7 is the same as FIG. 5 except that FIG. 7 does not include the candy stick. Therefore without the candy stick, there is clearly a spacing between the candy stick gripper and the inner surface of the control stick. FIG. 6 is a cross-sectional view taken below the lower end of the candy stick which also shows the spacing.

In use of the candy sucker holder, the sucker stick is passed through the upper funnel shaped housing end and passes through the lock sleeve and on into the control stick. The lower end of the candy stick is guided by the funnel shape in the candy stick holder to enter the candy stick gripper. As the candy stick enters the gripper the upper end of the gripper expands outwardly and thereby applies a holding force on the end of the candy stick. In this position the candy sucker will be confined within the funnel shaped housing end. When it is desired to consume some of the sucker, the control stick is pushed upwardly with the radial pins in the vertical slots of the lock sleeve until the pins reach the horizontal slots, at this time the control stick is rotated to lock the control stick in place. When desired the control stick can be rotated to unlock the pins and then moved downwardly to again store the candy in place.

The housing and any other part can be made from plastic, suitable paper or cardboard, or any other suitable material. The housing and cylindrical control stick may be painted or otherwise have decorative paper thereon. The candy sucker can have a design or a configuration of ones brain and as such would be a brain sucker. Since the sucker may be designed as ones brain the housing could have a decorative design of ones head. Any appropriate design may be painted on or placed on the housing by any other means such as a stick paper of different design on the non-sticky side.

What is claimed is:

1. A candy holding and dispensing device which comprises a housing, said housing including an upper end and a lower end, a closure (16) which closes said lower end of said housing, a lock sleeve (22) secured to said closure of said lower end coaxial with said housing, said lock sleeve having a central axial opening with oppositely disposed vertical slots (42) which extend toward said upper end away from said bottom closure, and horizontal slots (44) in said lock sleeve which extend from said vertical slots, a vertically movable candy control stick (32) which extends downward from said housing and upwardly through said lock sleeve coaxial therewith, said movable candy control stick including an axial aperture along its length, a control stick ring secured to an upper end of said candy control stick, oppositely disposed lock pins extending from said candy control stick, a candy stick gripper (37) within said candy control stick, a vertical expansion slit in said candy stick gripper that extends downwardly from an upper end of said candy stick gripper in an area opposite said oppositely disposed pins, said candy stick gripper adapted to receive one end of a candy stick to which a candy sucker is secured and said candy stick has a length sufficient to extend downwardly into said candy stick gripper and to be secured within said candy stick gripper by expansion of said vertical expansion slit.

2. A candy holding and dispensing device as claimed in claim 1 in which said control stick includes a funnel shape portion therein in an area of said oppositely disposed pins which function as a guide for guiding one end of the candy stick into said candy stick gripper for securing the candy stick within said candy stick gripper.

3. A candy holding and dispensing device as claimed in claim 1, in which, said housing includes a conical section that extends inwardly coaxial with said housing, said conical section having an upper end with substantially the same diameter as said upper end of said housing and a central opening in a lower end thereof.

4. A candy holding and dispensing device as claimed in claim 2, in which, said housing includes a conical section that extends inwardly coaxial with said housing, said conical section having an upper end with substantially the same diameter as said upper end of said housing and a central opening in a lower end of said conical section through which the candy stick passes.

5. A candy holding and dispensing device as claimed in claim 3 in which said conical section extends substantially half-way into said housing.

6. A candy holding and dispensing device as claimed in claim 4 in which said conical section extends substantially half-way into said housing.

7. A candy holding and dispensing device which comprises a housing, said housing including an upper end closure and a lower end closure, said lower end closure (16) closes said lower end of said housing coaxial with said housing, a lock sleeve having a central axial opening with oppositely disposed vertical slots (42), said vertical slots extend toward said upper end away from said bottom closure, and horizontal slots (44) in said lock sleeve which extend from said vertical slots, a vertically movable candy control stick (32) which extends downward from said housing and upwardly through said lock sleeve and said upper end closure coaxial therewith, said movable candy control stick including an axial aperture along its length, a control stick ring secured to an upper end of said candy control stick, oppositely disposed lock pins extending from said candy control stick, a candy stick gripper (37) secured within said candy control stick in an area between said oppositely disposed lock pins, said candy stick gripper is adapted to receive therein one end of a candy stick to which a candy sucker is secured and said candy stick has a length sufficient to extend downwardly into said candy stick gripper and to be secured within said candy stick gripper.

8. A candy holding and dispensing device comprising a housing, a lower end closure that closes a lower end of said housing, an upper end closure, said upper end closure has an inwardly extending shape of at least a part of a piece of candy in which said piece of candy can be received outwardly of said upper end closure, said upper end closure having an axial aperture for passage of one end of a candy-free end of a candy stick to which said piece of candy is secured to an opposite end, an appendage extending from said housing which passes through an axial opening in said lower end enclosure, said appendage including a candy stick gripper means for securing said candy-free end of said candy stick thereto and for securing said piece of candy within said inwardly extending shapes and outwardly of said upper end of said housing, and lock means within said housing for locking a corresponding lock means on said appendage in an up-locked position with said piece of candy extending above said upper end of said housing.

\* \* \* \* \*